Nov. 15, 1927.
A. L. GENTER ET AL
1,649,581
METHOD AND MEANS FOR REMOVING FILTER CAKES FROM FILTER MEDIUMS
Filed April 29, 1921   4 Sheets-Sheet 1
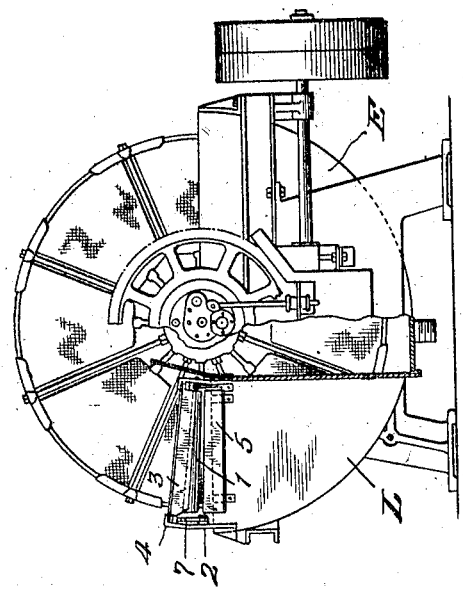
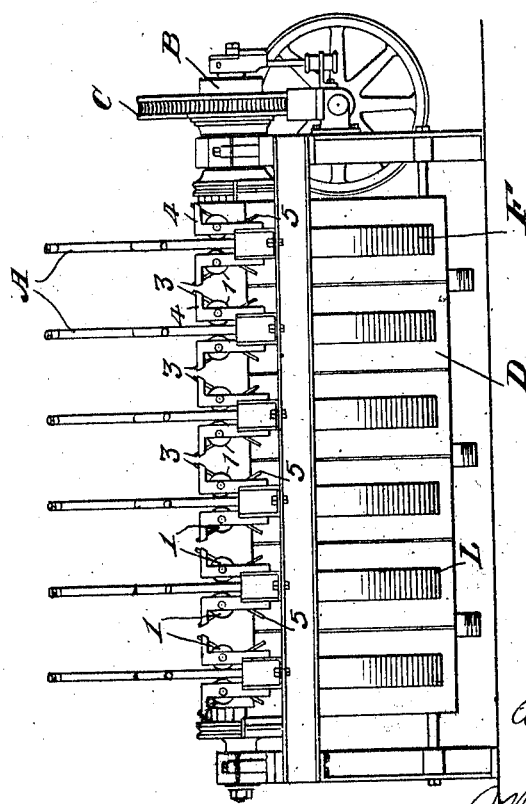

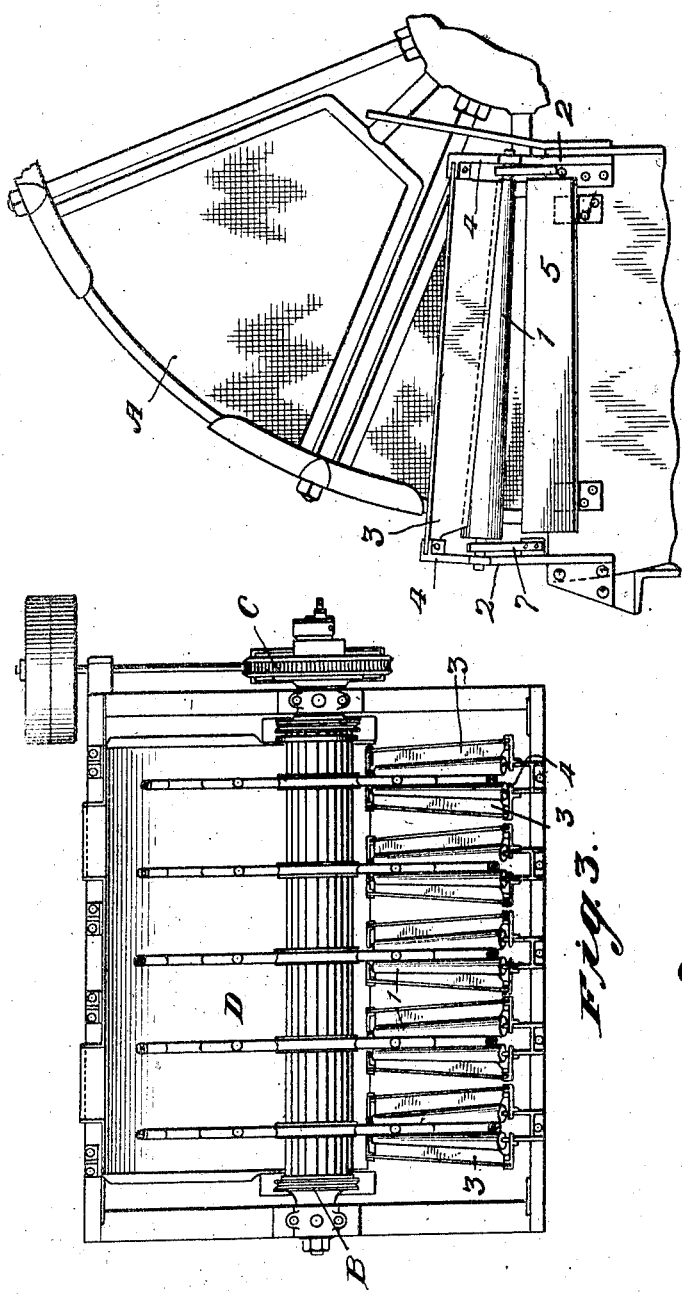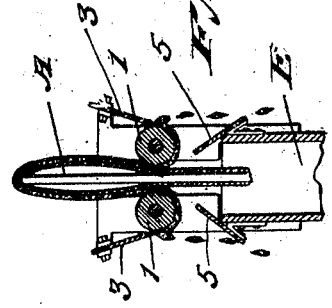

Nov. 15, 1927. 1,649,581
A. L. GENTER ET AL
METHOD AND MEANS FOR REMOVING FILTER CAKES FROM FILTER MEDIUMS
Filed April 29, 1921 4 Sheets-Sheet 3
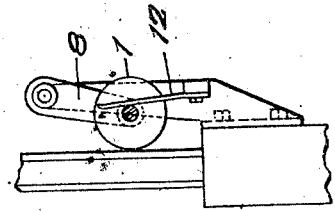
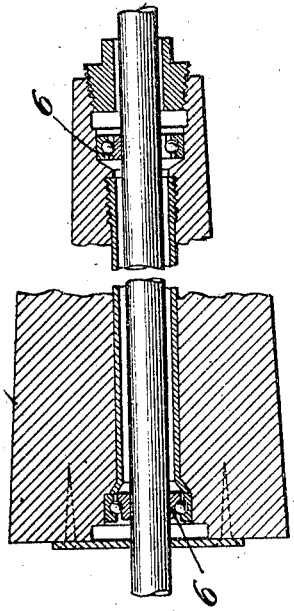
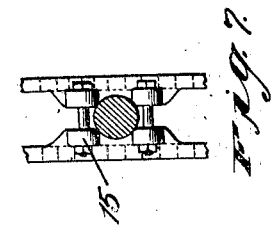
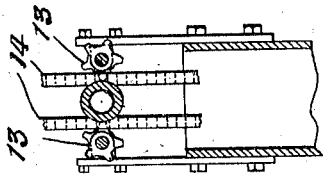
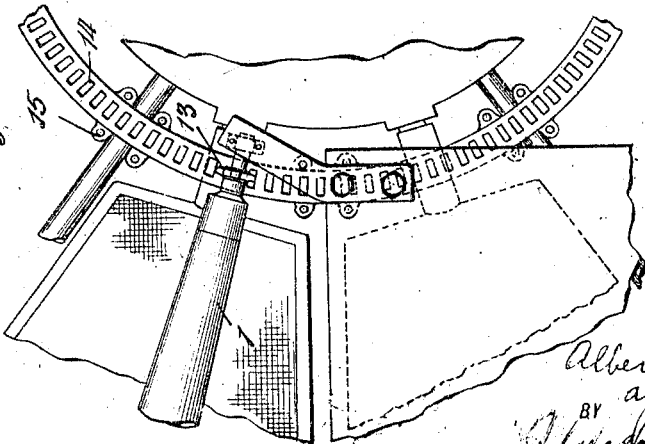

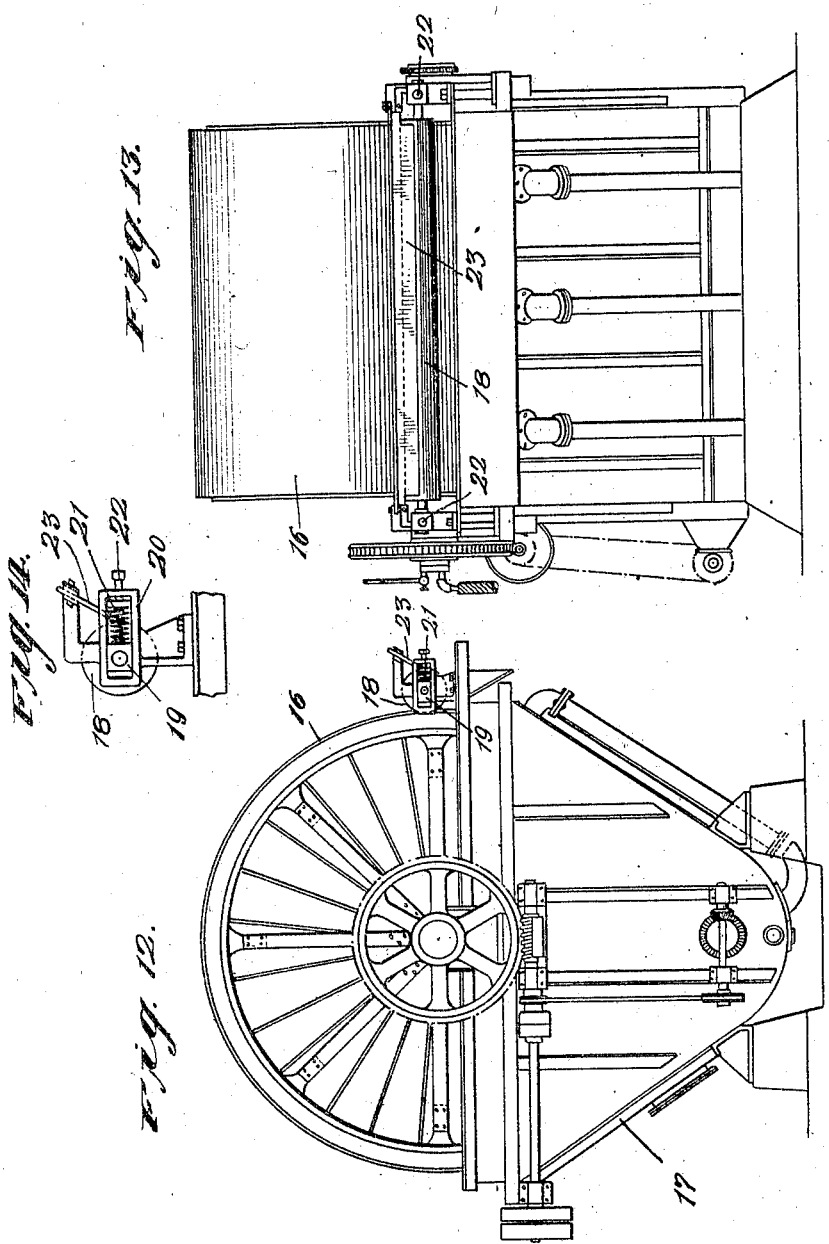

Patented Nov. 15, 1927.

1,649,581

UNITED STATES PATENT OFFICE.

ALBERT L. GENTER AND JASPER A. McCASKELL, OF SALT LAKE CITY, UTAH, ASSIGNORS TO UNITED FILTERS CORPORATION, OF NEW YORK, N. Y., A CORPORATION OF DELAWARE.

METHOD AND MEANS FOR REMOVING FILTER CAKES FROM FILTER MEDIUMS.

Application filed April 29, 1921. Serial No. 465,581.

Our invention relates to a new method and means for removing the filter cake or accumulation from filter mediums of which the following, taken in connection with the accompanying sheets of drawings, is a full, clear and concise description.

Our invention in one of its broader aspects involves the idea of adhesively removing the cake accumulation from the filter medium, and consists in employing a cake-removing member or element, the surface of which has greater power of adhesion than the surface of the filter medium, so that during the rotation of the filter medium, the accumulated cake will be automatically transferred to the surface of the cake removing member, solely through the power of adhesion, after which the cake is removed from the member preferably by scraping at a suitable point of discharge.

In carrying our invention into practice, we have found that a cake removing member in the form of a wooden roller to be very advantageous, as the surface of the wood possesses the characteristic of adhesion to a marked degree. This wood roller is positioned adjacent the effective filter surface, so as to contact with the cake accumulation and draw it away from the surface of the filter medium as the latter is moved or rotated during the normal operation of the filter.

In the accompanying drawings, forming a part of this specification, we have illustrated by way of examples, certain adaptations of the principles of our invention in connection with filters of the rotating leaf type as well as filters of the drum type.

Figure 1 is a view in side elevation, parts being removed or broken away, of a filter of the rotating leaf type, constructed in accordance with and embodying our invention.

Figure 2 is an end view thereof, parts being broken away to more clearly illustrate structural details.

Figure 3 is a plan view thereof.

Figure 4 is an enlarged detail view, partly in section, showing the relation of the wood roller to the filter leaf, part only of the latter being shown.

Figure 5 is an enlarged detail sectional view through a portion of the filter leaf, pan and adjacent cake removing members and other associated parts, illustrative of the manner in which the cake accumulation is removed.

Figure 6 is an enlarged detailed view illustrating positive means associated with the rotating filter leaf for rotating the cake removing member.

Figure 7 is an enlarged detail of clamping means employed for mounting the rack of the driving means shown in Figure 6, upon the filter leaf frame.

Figure 8 is an enlarged detail in section showing the driving connections between the cake removing members on adjacent sides of each filter leaf.

Figure 9 is an enlarged detail partly in section illustrating a ball bearing support for the ends of the cake removing roller.

Figures 10 and 11 are enlarged details of modifications illustrative of pressure creating means for forcing the wood roller against the cake formation.

Figure 12 is an end view of a filter of the rotating drum type, constructed in accordance with and embodying our invention.

Figure 13 is a view in side elevation thereof.

Figure 14 is an enlarged detail, showing the cake removing roller and the co-operating scraper for removing the adhered cake therefrom.

Referring more particularly to Figures 1 to 11, inclusive, the filter illustrated is of the well-known rotating leaf type and can briefly be described as consisting of a plurality of spaced filter leaves or discs A carried upon a horizontal, centrally located shaft B, the ends of which are mounted in suitable bearings, a driving mechanism C being employed for imparting a rotary movement to the shaft and filter discs.

The leaves rotate in a suitable tank D having a main chamber at one side thereof, extending throughout its entire length as at E. This chamber is substantially in the form of a quarter cylinder open at the top and having a curved side wall, a vertical side wall, and substantially quadrant-shaped end walls. The upper surfaces of the chamber walls lie in a plane parallel to a horizontal plane passing through the axis of the shaft and the vertical side wall lies in a plane parallel to a vertical plane passing through the axis of the shaft. The tank further includes a plurality of individual, trough-shaped chambers spaced from one another in the direction of the length of the tank and communicating with the main chamber through openings formed in the vertical wall thereof. As shown these individual chambers are formed as separate castings secured to the vertical side wall of the main chamber and registering with openings formed therein, the open tops of the chambers lying in the same plane as the open top in the main chamber. The individual chambers are positioned to register with the several filter discs and the parallel walls thereof are spaced apart sufficiently to permit the discs to rotate freely without danger of striking against the chamber walls.

The construction of the filter discs, as well as the tank, form no part of our present invention, other than in their association and combination with the principles involved in our new method of cake removal, the filter discs being constructed in accordance with the patents to O. J. Salisbury, No. 1,293,555, dated February 4th, 1919 and No. 1,259,139, dated March 12, 1918; while the particular tank construction forms part of the subject-matter of a co-pending application, Serial No. 227,519, filed April 9th, 1918, by Albert L. Genter.

The cake removing element is indicated by the numeral 1, and when used in connection with a filter of the rotating leaf type, a series or plurality of these members, in the form of wood or other types of rollers, are employed, two to each leaf, one on each side of the leaf, so as to remove the cake from each effective filter surface simultaneously as the leaf rotates between them. Each roller is mounted and supported by brackets 2, fastened in any suitable manner to the tank. These rollers are preferably slightly spaced from the surface of the intermediate filter leaf, so as to allow for the building up of the cake accumulation to a desired degree, the built-up cake itself engaging the peripheral surface of the roller to which it adheres during its rotation.

The wood rollers 1 are slightly tapered or coniform in shape with their reduced ends journaled adjacent the axis of the leaf,—this for the purpose of effecting a true rolling contact between the surface of the roller and the cake accumulation on the leaf and the same peripheral speed to the roller as the leaf. The roller extends across the effective filtering surface of each segment of the leaf so that the entire filter cake accumulation will be brought into contact therewith during the rotation of the leaf and is thus removed in its entirety. These rollers, as explained, are supported above the tank and are preferably adjacent the side walls of the indentations or crenellations which form the individual receptacles for the filter leaves, so that the spaces between the individual receptacles may be utilized as discharge spaces for the removed cake; that is to say, as the rollers remove the cake from the rotating leaves, the cake is carried beyond the adjacent side walls and is removed or discharged between the receptacles where it may be deposited in a suitable hopper or the like.

Of course, while we have illustrated and described a conical roller used in connection with the leaf type of filter, manifestly, we do not limit ourselves thereto as good results may be obtained from using a roller in the form of a true cylinder throughout its length.

To effect the removal of the discharge cake from the roller, we mount a scraper 3, supported in suitable standards 4, at each end. The effective edge of this scraper preferably does not contact with the roller but is adjusted so as to be removed therefrom approximately one-sixteenth to an eighth of an inch away, so as to leave a small layer of cake upon the peripheral surface of the roller. As the roller rotates a major portion of the cake is peeled off, much in the manner illustrated in detail in Figure 5. In order to prevent any portion of the cake from accidentally falling back into the tank, deflecting plates 5 may be employed, these being suitably riveted to the side walls of the individual leaf receptacle portions of the tank, as shown. The scraper member 3 may be formed of sheet metal, although we do not restrict ourselves thereto nor do we restrict ourselves to a scraper, as manifestly other means may be employed for removing the adhered cake from the roller, such as, for instance, a rotating brush or the like.

As a cake removing element, we find that a wood roller admirably answers the purpose, since it inherently possesses a higher degree of adhesiveness than that of the leaf surface and thus effects a satisfactory transfer of the cake accumulation. We do not desire to be limited to a roller made of wood, as for certain purposes, other materials may be found to perform satisfactorily, for instance, it may be found desirable to use a wood roller having a covering or sleeve of a different material thereon, such as rubber or the like. The wood roller, being rotatably mounted as described, is propelled or rotated through and by reason of its frictional adhering contact with the cake accumulation on the leaf as the leaf rotates; thus the roller turns of its own accord in carrying the cake from the leaf to the point of discharge. We have found that by mounting the ends of each roller in ball races 6 (see Figure 9), the friction is decreased and a free and more satisfactory action of the roller is obtained. During the operation of removing the cake from the filter leaf in filters of this character, air is admitted to the interior of each segment of the leaf as it approaches the point of discharge, in a manner similar to that described in said application Serial No. 227,519, so that the filter covering is somewhat bulged, as is well understood in the art, thus facilitating the separation of the cake from the filter covering. By inflating the filter segments in the well-known manner, the filter cloth is flexibly forced outwardly against the roller and pastes, so to speak, the accumulated cake upon the roller, which as it rotates, pulls the cake away from the filter fabric.

In certain instances where the character of the cake is such that the cake sticks in the pores of the cloth, there is by consequence thereof greater adhesion between the cake and the cloth than between the cake and the roller. The inflation of the filter leaf is quite essential to remove the cake from the cloth. By admitting the compressed air to the inside of the leaf, the pressure of the air forces the cake out of the pores of the cloth and against the roller to which it adheres and is removed in the manner heretofore described.

It might be found desirable to provide suitable pressure creating means, such as springs 7, or the like, to maintain sufficient frictional contact between the roller and the cake to cause the roller to rotate in the intended manner to carry the cake to the point of discharge. This pressure may be found desirable inasmuch as the scraper 3 will somewhat retard the movement of the roller by reason of its contact therewith. Various means may be employed for obtaining and maintaining this pressure between the roller and the filter cake on the filter element, and, in Figures 10 and 11, two such suitable means are illustrated.

In Figure 10, the roller 1 is mounted on a pair of arms 8, which in turn are associated with a pair of arms 9, forming bell crank levers pivoted at 10. On the free end of the arms 10 are suspended weights 11, which supply the required power to maintain the roller 1 in firm contact with the cake accumulation on the filter leaf at all times. In Figure 11, the arms 9 and weights 11 are dispensed with and a leaf spring 12 bearing upon the axle or bearing stud of the roller is employed to maintain this desired contact underpressure.

In some instances, where the nature of the cake accumulation admits, it may be desirable to positively rotate the rollers by using some external source of power and thus not rely solely upon the frictional engagement between the roller and the cake; for instance, where certain cyanide slimes are being handled, the slippery nature of the cake formation may cause skidding between the cake and roller, due in a measure to the existence of the retarding friction of the scraper upon the roller, which may be in excess of the friction that may exist between the cake and the roller. In order to effect this positive rotation of the roller in keeping with the speed of rotation of the filter leaf, we propose to provide the reduced end of each roller shaft with a sprocket wheel 13 and upon the spider like frame of the filter leaf, a circular cooperating rack 14, clamped by suitable means 15 to the radial rods of the spider, these racks being provided likewise in pairs and fastened at opposite sides of each filter leaf, so as to cooperate with each pair of rollers as is obvious.

As the filter discs revolve, the rollers are likewise caused to revolve in the correct direction and at the proper synchronized speed, thus removing the cake in the manner heretofore described. We might add that we have found that in filters of large dimensions that this positive driving means is not essential owing to the existence of a high degree of friction present between the moving cake formation and the wood roller.

In Figures 12 to 14, inclusive, we have illustrated the principles of our invention embodied in the well-known type of drum filter. In this type of filter, the effective filtering surface is cylindrical as at 16, and comprises a filter fabric or medium mounted upon a frame which rotates in a pan or tank 17, into which the substance to be filtered is admitted, the drum rotating thereon, carries the accumulated cake upon its surface during its rotation to the point of discharge at which point the wood roller 18, which in this instance is cylindrical throughout its entire length is located.

This wood roller is shown as being mounted in blocks 19, slidably arranged in end frames 20, under the tension of springs 21, regulating means 22 being provided for regulating the amount of tension applied to the roller and through it to the surface of the cake upon the drum. A scraper 23 is mounted having its scraping edge in contact with the roller 18 in position to scrap the adhered cake from the roller and discharge it beyond the tank 17. In this form of construction, it may be found of advantage under certain conditions to use rollers of a more flexible material so as to conform to any irregularity in the contour of the drum. The rollers 18 may also be positively rotated from some suitable source of external power, should requirements demand.

In addition to the benefits and advantages attained by our invention as above set forth, it might be desirable to mention that economies are effected by eliminating the wear which is incidental to the use of the heretofore known stationary scrapers, which bear directly against the filter medium and are used to remove the cake formation. Also the power consumption of the filter itself is greatly reduced, thus minimizing operating costs. Furthermore, the effectiveness and efficiency of removing the cake is greatly increased by reason of the fact that the roller to which the cake adheres tends to pull the solid matter out of the pores of the filter medium, thus increasing the capacity of the filter as contra-distinguished from the old style edge scraper, the tendency of which is to smear the solids across the surface of the filter medium, and to a certain extent close up the pores. Furthermore, when used in connection with the drum type of filter, the usual wire windings can be dispensed with, which in itself is of greater advantage because the wire windings block out a certain amount of the active filter area and retard or impede cleansing of the filter cloth. Furthermore, it will be apparent that a relatively loose filter fabric on the drum of a drum type of filter may be employed, as inflation of the medium will cause the cake accumulation to be pasted over the surface of the rotating wood roller and as the wood roller rotates, it exerts a tendency to pull the adhered cake away from the cloth. Furthermore, by dispensing with the wire windings, the capacity of the filter is materially increased, the expense of frequently renewing the scrapers heretofore used, which bear directly against the wire windings is eliminated, while wear upon the filter cloth itself is brought to a minimum, owing to the fact that the wood roller is not in contact with the fabric in any harmful way. Our invention eliminates the use of rigid scrapers in all types of filters where their bearing directly upon the filter medium creates destructive friction as the wood roller of our invention through its rolling action possesses no destructive tendency.

While we have illustrated certain preferable embodiments of the principles of our invention in connection with two well known types of filter structures, we do not desire to be limited to the application of our invention to such structures, or in the manner of carrying the same into practice, as regards structural details. We rather desire to be understood that in the appended claims, we wish to cover our said principles of invention in whatever form or in whatever manner they may be usefully employed.

Having thus described our invention, what we claim and desire to secure by Letters Patent is:

1. In combination with a filter medium of a cake removing member adapted to adhesively remove the cake formation therefrom, means for applying pneumatic pressure to the inner surface of the filter medium to assist in the detachment of the cake therefrom, and means for preventing the adhered cake from building up on the removing member.

2. In combination with a filter medium of a rotatable member adapted to contact with the cake and remove it solely by adhesion, means for bulging said medium outwardly so as to force the cake thereon against said rotatable member and a scraper juxtaposed to the member adapted to remove the adhered cake therefrom.

3. In combination with a rotatable filter element of the leaf type of a conical member in rolling contact with the surface of the cake accumulation adapted to adhesively remove the cake from the element and means for bulging said element outwardly so as to force the cake thereon against said conical members.

4. In combination with a rotatable filter element of the leaf type of a conical member in rolling contact with the surface of the cake accumulation adapted to adhesively remove the cake from the element, and a scraper member bearing against the conical member and adapted to remove the adhered cake therefrom.

5. In a filter, the combination with a rotating filter leaf, of a cake removing element comprising a wood roller journaled adjacent the leaf and positioned in contact with the cake accumulation and positive driving means for imparting rotary motion to the roller in keeping with the speed of rotation of the filter leaf.

6. In a filter the combination with a rotating filter leaf of a cake removing element adapted to engage the cake and remove it from the leaf by adhesion, said element being tapered and positioned in true rolling contact with the surface of the cake formation, and means for imparting movement simultaneously to the element and to the leaf.

7. In a filter, the combination with a rotating filter leaf, of a cake removing element adapted to adhesively engage the cake and remove it from the leaf, said element being tapered and positioned so as to effect a true rolling action between the surface thereof and the cake, and means for imparting movement simultaneously to the element and the leaf, and means co-operating with the element for removing the adhered cake therefrom at the point of discharge.

8. In combination, a filter element of the rotatable leaf type, a cake remover comprising a conical wood roller, means for supporting the roller in contact with the cake formation, and means at the reduced end of the roller adapted to impart rotation thereto, said means comprising a sprocket mounted upon the roller shaft and a rack engaging said sprocket mounted upon the rotating filter leaf.

9. In combination, a filter medium, means for applying pneumatic pressure to the interior thereof to distend the pores and facilitate removal, a rotatably mounted cake removing element, and pressure applying means for urging the cake removing element under pressure toward the filter medium.

10. The method of removing the accumulation of solid matter from a filter medium, which consists in employing a rotatable member bearing against the solid matter, applying air pressure to the underside of the filter medium to loosen the solid matter from the pores of said medium and rotating the filter medium and rotatable member so that the cake will be removed by the rotatable member.

11. The method of removing cake from a filter surface, which consists in adhesively rolling the cake therefrom, applying air pressure to the underside of the filter surface to assist in such cake removal.

12. In a filter, the combination with a rotating filter surface, of a cake removing element adapted to adhesively engage the cake, means for admitting air pressure to the underside of said surface, and means for imparting movement simultaneously to the cake removing element and the filter surface.

13. In a filter, the combination with a rotating filter leaf, of a cake removing element adapted to adhesively engage the cake, means for admitting air pressure to the underside of the leaf, means for imparting movement simultaneously to the cake removing element and the leaf, and means cooperating with the cake removing element for removing the adhered cake therefrom at a suitable point of discharge.

14. In combination, a filter, a discharge roller therefor, and means for applying pneumatic pressure to the interior of the filter to assist in the removal of the cake therefrom.

15. The method of causing filter cake to adhere to a discharge roller, which consists in supplying pneumatic pressure to the interior of the filter so as to minimize the adhesion of the cake to the filter surface.

16. In combination, a rotary filter, means for subjecting the cake deposited thereon to pneumatic pressure to dry the cake partially, means to subsequently subject the inside of the filter to pneumatic pressure to bulge the filter medium, and roller means for discharging the partially dried cake.

17. The method of removing filter cake deposited on the rotary filtering material of a filter, which consists in causing said material to bulge outwardly so as to open the pores of the fabric and move the cake into contact with a discharging element having a surface on which the filter cake tends to adhere, and advancing said discharging element so as to provide continuously to said filtering material a fresh surface for the reception of filter cake.

18. The combination with a rotary filter comprising a framework provided with a flexible covering of filtering material, of means for bulging said material outwardly so as to open the pores of the fabric, means having a surface against which the filter cake tends to adhere when the cake is pressed into contact therewith by said bulged covering, and means for moving said filtering material and said second-mentioned means at substantially the same surface velocity so that the filter cake is drawn off said filtering material and applied to the said means.

19. In combination with a rotary filter comprising a filter cloth, of means for discharging filter cake from said cloth, said means having a surface moving substantially in unison with the surface of said filter cloth, and means for applying pneumatic pressure to the inner surface of said cloth, so as to force the cake deposited on the cloth against the surface of said discharging means.

20. In a filter, the combination with a rotating filter medium, of means for applying pneumatic pressure to the interior thereof to open the pores of the fabric, a cake removing element in the form of a wood roller, means for positioning said roller adjacent the surface of the filtering medium, said means including a pair of bell-crank levers supporting the roller at its ends and weights suspended from the free ends of the bell-crank levers for causing the roller to bear with pressure against the filter medium.

In testimony whereof we have affixed our signatures to this specification.

ALBERT L. GENTER.
JASPER A. McCASKELL.